Patented Nov. 27, 1951

2,576,245

UNITED STATES PATENT OFFICE 2,576,245

INTERPOLYMERS

Pliny O. Tawney, Passaic, N. J., assignor to United States Rubber Company, New York, N. Y., a corporation of New Jersey No Drawing. Application March 18, 1949,
Serial No. 82,300

16 Claims. (Cl. 260—23)

This invention relates primarily to a method of increasing the yield of soluble, convertible polymeric material obtained from the copolymerization of a castor-oil maleate with a copolymerizable monoolefinic compound. More particularly, my invention comprises the interpolymerization of castor-oil maleates with copolymerizable monoolefinic compounds, together with 2-propenyl compounds from the class of 2-propenyl alcohols, 2-propenyl chlorides, alkyl mono-2-propenyl ethers, and 2-propenyl esters of non-enic carboxylic acids, whereby improved yields of new, soluble, convertible interpolymers are obtained.

Copolymers of castor-oil maleates with monoolefinic compounds, e. g., styrene, are in many respects well adapted to the preparation of coating and laminating compositions which, after application, can be cured to a solvent- and heat-resistant state. In this connection they are particularly suitable for blending with other thermosetting resins, e. g., urea-formaldehyde resins and melamine-formaldehyde resins, to secure more flexible products. However, such resins derived from castor-oil maleates of high acid number, e. g., 50–100, i. e., those containing relatively large amounts of maleic acid ester groups (such as are obtained, for example, from the reaction of 1 mole of castor-oil with 2–3 moles of maleic anhydride in a manner well known to those skilled in the art), tends to form an insoluble gel during the copolymerization reaction and before more than a minor proportion of monomers has been converted to the copolymeric form. Such products are of limited commercial utility since the presence of the masses of insoluble gel effects serious discontinuities in the resulting coating or laminate such as cracks, lumps and blisters. A soluble resin can be obtained, albeit in low yields, by halting the copolymerization prior to gelation, although the large amounts of unreacted monomeric starting materials remaining must be removed, purified and recycled for use in subsequent copolymerizations in order to achieve some degree of economic feasibility. The copolymerization of castor-oil maleates of relatively low acid number, e. g., 20–40 (such as can be obtained from the reaction of 0.3–0.6 mole of maleic anhydride with 1 mole of castor-oil), with styrene shows a diminished tendency toward premature gelation but the resulting resins are softer, less mar-resistant and often require more stringent curing conditions to achieve a satisfactory degree of solvent- and heat-resistance in the final product than those derived from the castor-oil maleates of higher acid number.

I have now unexpected discovered that, when a castor-oil maleate is interpolymerized with styrene and with a 2-propenyl compound of the class defined, the conventional premature gelation is averted to such an extent that markedly improved yields of new, soluble, ternary interpolymers are obtained. Moreover, as the amount of the monomeric interpolymerizable 2-propenyl compound in the initial reaction mixture is increased, the yield of the resulting soluble ternary interpolymers is likewise increased and in this way, it is now possible to convert the major proportion of the castor-oil maleate and the styrene to the soluble polymeric form without danger of premature gelation.

Although styrene has been cited above as illustrative of the monoolefinic compounds which are suitable for copolymerization with castor-oil maleates in the method of my invention, various substituted styrenes may also be employed, including the alpha- and para-substituted styrenes, e. g., p-chlorostyrene, p-methylstyrene, alpha, p-dimethylstyrene, p-fluorostyrene, p-trichloromethylstyrene, p-methoxystyrene, and 2,5-dichlorostyrene. The styrenes can be replaced in whole or part by other copolymerizable monoolefinic hydrocarbons, e. g., vinylnaphthalene and aliphatic olefinic hydrocarbons, especially the lower aliphatic olefinic hydrocarbons, i. e., those having from 2 to 6 carbon atoms, e. g., ethylene, propylene and isobutylene, although many of the more reactive olefins suffer the economic disadvantage of being gases at room temperature and hence they will require pressurized equipment for the copolymerization reaction.

Other suitable monoolefinic compounds which can be used in place of styrene but which tend to yield softer resins include vinyl mono-esters of non-enic acids, e. g., vinyl acetate, vinyl butyrate and vinyl benzoate, and mono-vinyl ethers, e. g., vinyl ethyl ether, vinyl propyl ether and vinyl benzyl ether, and the esters of monoolefinic monocarboxylic acids with non-enic alcohols, e. g., methyl acrylate, n-butyl acrylate, tolyl acrylate, methyl methacrylate, methyl chloroacrylate and methyl crotonate. The monoolefinic acids themselves can be employed although the resulting resins are more sensitive to water and other hydroxylic solvents and to alkali. Besides esters, other hydrolyzable derivatives of such monoolefinic acids can be employed, such as the anhydrides, acid chlorides, nitriles and amides, the two latter yielding resins which are harder but are compatible with fewer solvents.

The copolymerizable 2-propenyl alcohols, ethers and esters which are useful in my invention can be represented by the formula R'CH=C(R)—CH₂X wherein R and R' may be one of the radicals hydrogen, chlorine, methyl, chloromethyl and ethyl, one of R or R' being hydrogen when the other is chlorine, methyl, chloromethyl or ethyl; and X is one of the radicals chlorine, hydroxyl, alkoxy (e. g., methoxy, ethoxy, beta-hydroxyethoxy, propoxy, isopropoxy, n-butoxy, isobutoxy, amyloxy, hexoxy, heptoxy, octoxy, nonoxy, decoxy), aryloxy (e. g., phenoxy, tolyloxy), aralkoxy (e. g., benzyl-oxy), and acyloxy (e. g., acetoxy, propionoxy, isobutyroxy, valeroxy, benzoyloxy). Illustrative of such compounds are allyl chloride, methallyl chloride, crotyl chloride, 2,3-dichloropropene, 1,4-dichlorobutene-2, 2-(chloromethyl) allyl chloride, allyl alcohol, methallyl alcohol, 2-chloro-allyl alcohol, crotyl alcohol, 2-ethylallyl alcohol, allyl methyl ether, methallyl ethyl ether, beta-allyloxyethanol, allyl propyl ether, methallyl butyl ether, methallyl amyl ether, methallyl heptyl ether, allyl octyl ether, crotyl ethyl ether, 2-chloroallyl ethyl ether, methallyl phenyl ether, allyl benzyl ether, allyl acetate, 2-chlorallyl propionate, methallyl butyrate, ethallyl valerate and cinnamyl acetate.

The castor-oil maleates, as is well known to those skilled in the art, are prepared by the esterification of maleic acid or maleic anhydride with castor-oil. Usually about 1 mole of castor-oil is employed per mole of maleic anhydride. This invention also contemplates the employment of castor-oil esters obtained by substitution of some or all of the maleic anhydride by the homologues of maleic acid, such as citraconic acid or citraconic anhydride. If desired, various modifying ingredients, such as linseed oil, may be present in the reaction mixture during the preparation of the ester to be employed in this invention.

In the practice of my invention a castor-oil maleate, preferably one having an acid number of from about 30 to 100, is reacted with a copolymerizable monoolefinic compound as previously defined and a 2-propenyl compound of the class defined, preferably in proportions within the range of from 3 to 12 moles of the copolymerizable monoolefinic compound and from 6 to 24 moles of the 2-propenyl compound, per mole of the castor-oil maleate (based on a value of 1000 as a rough average for the unit molecular weight of the castor-oil maleate). The reaction is ordinarily carried out at temperatures in the range of 25–120° C., and most frequently in the range 40–100° C., for reaction time sufficient to form at least an appreciable quantity of the soluble interpolymer. Suitable reaction times will usually be found to be from 2 to about 40 hours. Suitable promoters or catalysts for the reaction include conventional sources of free radicals such as organic peroxides, e. g., benzoyl peroxide, acetyl peroxide and tertiary-butyl hydro-peroxide, in amounts of from about 0.1 to 5.0% by weight of the total interpolymerizable reactants.

The extent of the reaction can be gauged by the viscosity of the reaction mixture, and the soluble interpolymer can be isolated therefrom by evaporation of any unreached 2-propenyl compound or by precipitation of the interpolymer through addition of a non-solvent, e. g., methanol.

The resulting resins can be dissolved in appropriate solvents, e. g., acetone, xylene, or mixtures thereof and employed as coating, impregnating or laminating compositions, either alone or in conjunction with other polymeric materials such as urea-formaldehyde resins. Upon application of heat, these compositions are converted to a solvent- and heat-resistant state.

The following examples disclose my invention in more detail. All parts are by weight.

EXAMPLE 1

One hundred parts of castor-oil maleate are interpolymerized with 121 parts of styrene and various 2-propenyl compounds at 60° C. in the presence of benzoyl peroxide until the point of incipient gelation is attained in each case. The reaction mixtures are then cooled and diluted with an excess of methanol and the precipotated interpolymers are washed thoroughly with methanol before drying in vacuo to constant weight.

In Table I below are summarized the amounts of the monomeric 2-propenyl compounds, peroxide and the resulting soluble interpolymers as well as the reaction times. To further illustrate the advantages of my invention, examples of prior art copolymerization of castor-oil maleate with styrene in the absence of the 2-propenyl compounds, are also included (Ia, b).

Table I

| | 2-Propenyl Compound | | Benzoyl Peroxide | Reaction Time (Hrs.) | Soluble Inter-Polymer |
|---|---|---|---|---|---|
| a | | [1]186.0 | 1.1 | 4.7 | 15.2 |
| b | | | 2.04 | 6.4 | 24.2 |
| c | Methallyl Chloride | 52.5 | 1.35 | 5.9 | 31.4 |
| d | Methallyl Chloride | 105.5 | 1.81 | 8.7 | 49.4 |
| e | Methallyl Chloride | 210.5 | 2.18 | 29.3 | 75.2 |
| f | Methallyl Alcohol | 168.0 | 3.16 | 8.7 | 40.3 |
| g | Methallyl Ethyl Ether | 233.0 | 2.28 | 12.5 | 60.0 |
| h | Methallyl Acetate | 266.0 | 2.42 | 11.2 | 44.2 |
| i | Allyl Alcohol | 135.0 | 1.75 | 7.2 | 40.3 |

[1] 2-propenyl compound replaced by an inert solvent, benzene.

From the above table, the effect of even relatively small amounts of the interpolymerizable 2-propenyl compound in improving the conversion of the styrene and castor-oil maleate to the soluble interpolymeric form is readily apparent.

EXAMPLE 2

A mixture of 130 parts of castor-oil maleate (acid number, 40), 40 parts of styrene and 60 parts of allyl chloride is heated with 1.15 parts of benzoyl peroxide at 68° C. for 3.25 hours, an additional 1.15 parts of benzoyl peroxide being added after 3 hours. The interpolymer is isolated and purified as in Example 1 to yield 28.3 parts of soluble resin which can be converted to a solvent- and heat-resistant state by heating at elevated temperatures, e. g., 120–200° C.

Five and twenty-five hundredths parts of a 33.3% solution of the soluble interpolymer in xylene are blended with 1.42 parts of a 53.0% solution of urea-formaldehyde resin in xylene and poured onto a panel. After baking for 60 minutes at 125° C. a clear, hard insoluble film is obtained.

EXAMPLE 3

A mixture of 51.5 parts of castor-oil maleate (acid number, 54), 51.5 parts of vinyl acetate, 103 parts of methallyl acetate and 1.03 parts of benzoyl peroxide is heated at 80° C., with stirring, for 3.2 hours in an atmosphere of carbon dioxide. From the reaction mixture 40.2 parts of soluble interpolymer are obtained.

A xylene blend of 70 parts of the resin and 30 parts of urea-formaldehyde resin is poured onto a panel and cured by heating at 150° C. for 30 minutes. The resulting film is insoluble in xylene, clear and flexible. It is somewhat softer than that obtained from the interpolymer of Example 2.

EXAMPLE 4

A mixture of 103.0 parts of castor-oil maleate (acid number, 54), 6.88 parts of methyl acrylate, 91.5 parts of methallyl chloride and 1.31 parts of benzoyl peroxide is heated, with stirring, at 80° C. for 8.5 hours under an atmosphere of carbon dioxide. During the first three hours 61.92 additional parts of methyl acrylate are added slowly to the reaction mixture. Twenty-one and two tenths parts of soluble interpolymeric product are obtained which, in a 70:30 blend (by weight) with urea-formaldehyde resins, yields a clear, hard, tough, colorless and insoluble film after curing at 150° C. for about 30 minutes.

Having thus described my invention, what I claim and desire to protect by Letters Patent is:

1. A method which comprises heating a mixture of a (A) mono-2-propenyl compound of the formula R'CH=C(R)—CH$_2$X wherein R and R' are radicals selected from the group consisting of hydrogen, chlorine, methyl, chloromethyl and ethyl, at least one of R and R' being hydrogen, and X is a radical selected from the group consisting of chlorine, hydroxyl, alkoxy, aryloxy, aralkoxy and acyloxy, with (B) an ester of castor-oil and an unsaturated dibasic organic acid selected from the group consisting of maleic acid and its homologues and (C) another copolymerizable monoolefinic compound, at a temperature sufficient to effect copolymerization of the said ingredients, in the presence of a polymerization catalyst in amount effective to cause copolymerization of said ingredients, whereby a fusible, convertible interpolymer of the said ingredients is formed.

2. A method which comprises heating a mixture of from 6 to 24 moles of a mono-2-propenyl compound of the formula R'CH=C(R)—CH$_2$X wherein R and R' are radicals selected from the group consisting of hydrogen, chlorine, methyl, chloromethyl and ethyl, at least one of R and R' being hydrogen, and X is a radical selected from the group consisting of chlorine, hydroxyl, alkoxy, aryloxy, aralkoxy, and acyloxy, one mole of a castor-oil maleate having an acid number of 30 to 100, and from 3 to 12 moles of another copolymerizable monoolefinic compound at a temperature of 40° to 100° C. in the presence of an organic peroxidic polymerization catalyst in amount of from 0.1 to 10.0% by weight of the said reactants, whereby a fusible, convertible interpolymer of the said reactants is formed.

3. A method as in claim 2 in which the 2-propenyl compound is allyl alcohol.

4. A method as in claim 2 in which the 2-propenyl compound is methallyl alcohol.

5. A method as in claim 2 in which the 2-propenyl compound is methallyl chloride.

6. A method as in claim 2 in which the 2-propenyl compound is allyl alcohol and the additional copolymerizable monoolefinic compound is styrene.

7. A method as in claim 2 in which the 2-propenyl compound is allyl alcohol and the additional copolymerizable monoolefinic compound is vinyl acetate.

8. A method as in claim 2 in which the 2-propenyl compound is allyl alcohol and the additional copolymerizable monoolefinic compound is methyl acrylate.

9. A soluble, convertible interpolymer of (A) a mono-2-propenyl compound of the formula R'CH=C(R)—CH$_2$X wherein R and R' are radicals selected from the group consisting of hydrogen, chlorine, methyl, chloromethyl and ethyl, at least one of R and R' being hydrogen, and X is a radical selected from the group consisting of chlorine, hydroxyl, alkoxy, aryloxy, aralkoxy, and acyloxy, (B) an ester of castor-oil and an unsaturated dibasic organic acid selected from the group consisting of maleic acid and its homologues and (C) another copolymerizable monoolefinic compound.

10. A soluble, convertible interpolymer of (A) a mono-2-propenyl compound of the formula R'CH=C(R)—CH$_2$X wherein R and R' are radicals selected from the group consisting of hydrogen, chlorine, methyl, chloromethyl and ethyl, at least one of R and R' being hydrogen, and X is a radical selected from the group consiting of chlorine, hydroxyl, alkoxy, aryloxy, aralkoxy, and acyloxy, (B) a castor-oil maleate and (C) another copolymerizable monoolefinic compound.

11. An interpolymer as in claim 10 in which the 2-propenyl compound (A) is allyl alcohol.

12. An interpolymer as in claim 10 in which the 2-propenyl compound (A) is methallyl alcohol.

13. An interpolymer as in claim 10 in which the 2-propenyl compound (A) is methallyl chloride.

14. An interpolymer as in claim 10 in which the 2-propenyl compound (A) is allyl alcohol and the additional monoolefinic compound (C) is styrene.

15. An interpolymer as in claim 10 in which the 2-propenyl compound (A) is allyl alcohol and the additional monoolefinic compound (C) is vinyl acetate.

16. An interpolymer as in claim 10 in which the 2-propenyl compound (A) is allyl alcohol and the addittional monoolefinic compound (C) is methyl acrylate.

PLINY O. TAWNEY.

REFERENCES CITED

The following references are of record in the file of this patent:

UNITED STATES PATENTS

| Number | Name | Date |
|---|---|---|
| 2,378,195 | D'Alelio | June 12, 1945 |
| 2,378,197 | D'Alelio | June 12, 1945 |
| 2,414,525 | Hill et al. | Jan. 21, 1947 |
| 2,439,953 | Swiss et al. | Apr. 20, 1948 |
| 2,441,515 | Snyder | May 11, 1948 |
| 2,484,215 | Foster | Oct. 11, 1949 |

FOREIGN PATENTS

| Number | Country | Date |
|---|---|---|
| 540,169 | Great Britain | Oct. 8, 1941 |